United States Patent [19]

Murabayashi et al.

[11] Patent Number: 5,337,193
[45] Date of Patent: Aug. 9, 1994

[54] APPARATUS FOR SELECTIVELY RECORDING AND/OR REPRODUCING A VIDEO SIGNAL WITH A PCM AUDIO SIGNAL OR WITH AN FM AUDIO SIGNAL

[75] Inventors: Noboru Murabayashi, Tokyo; Takahito Seki, Kanagawa, both of Japan

[73] Assignee: Sony Corporation, Tokyo, Japan

[21] Appl. No.: 408,570

[22] Filed: Sep. 18, 1989

[30] Foreign Application Priority Data

Sep. 24, 1988 [JP] Japan ................. 63-239272
Jan. 25, 1989 [JP] Japan ................. 1-15889
Feb. 14, 1989 [JP] Japan ................. 1-34087

[51] Int. Cl.$^5$ .......................... G11B 5/02; G11B 15/12
[52] U.S. Cl. ........................ 360/19.1; 360/61; 360/25
[58] Field of Search ............... 360/19.1, 27, 18, 25, 360/61; 358/343, 330

[56] References Cited

U.S. PATENT DOCUMENTS

| | | | |
|---|---|---|---|
| 4,527,203 | 7/1985 | Kamai | 360/19.1 |
| 4,542,418 | 9/1985 | Yoneyama et al. | 360/19.1 |
| 4,630,134 | 12/1986 | Kanamaru | 358/343 |
| 4,679,097 | 7/1987 | Tomita | 360/19.1 |
| 4,698,693 | 10/1987 | Ishigaki et al. | 360/19.1 |
| 4,736,355 | 4/1988 | Kanamaru | 360/59 |
| 4,743,977 | 5/1988 | Yoshioka et al. | 360/19.1 |
| 4,743,978 | 5/1988 | Tanaka | 358/343 |
| 4,758,903 | 7/1988 | Noguchi et al. | 360/19.1 |
| 4,901,159 | 2/1990 | Hitotsumachi | 360/19.1 |
| 5,027,229 | 6/1991 | Suwa et al. | 360/19.1 |

FOREIGN PATENT DOCUMENTS

| | | |
|---|---|---|
| 0038566 | 10/1981 | European Pat. Off. . |
| 0275041 | 7/1988 | European Pat. Off. ......... 360/19.1 |
| 2152269 | 7/1985 | United Kingdom . |

*Primary Examiner*—Aristotelis Psitos
*Assistant Examiner*—Varsha V. Sheladia
*Attorney, Agent, or Firm*—William S. Frommer; Alvin Sinderbrand

[57] ABSTRACT

A VTR has heads adapted for reading out a video signal, a PCM audio signal, and an FM audio signal, respectively, from a magnetic tape, and a signal detecting circuit operable to detect which of the video, PCM and FM signals are recorded on the magnetic tape and to provide a signal indicative thereof to a system control circuit which controls a switching circuit for selectively connecting FM and PCM audio demodulating circuits with a signal output line, so that the video signal and the PCM audio signal or the video signal and the FM audio signal are output to be reproduced. The VTR further includes a recording system adapted to record a video signal, a PCM audio signal, and an FM audio signal in respective magnetic layers of a magnetic tape which are at different depths relative to the surface of the magnetic tape in accordance with a predetermined recording current relationship used for recording the video, FM audio and PCM audio signals so as to improve the S/N ratio of each signal when reproduced.

5 Claims, 8 Drawing Sheets

BAND-PASS CHARACTERISTIC

APPARATUS FOR SELECTIVELY RECORDING AND/OR REPRODUCING A VIDEO SIGNAL WITH A PCM AUDIO SIGNAL OR WITH AN FM AUDIO SIGNAL

BACKGROUND OF THE INVENTION

1. Field of the Invention

The present invention relates generally to an apparatus for recording and/or reproducing an information signal, and, more particularly, is directed to such apparatus in which differently modulated information signals recorded in a recording medium are identified for reproducing them appropriately.

2. Description of the Prior Art

Figure 4:
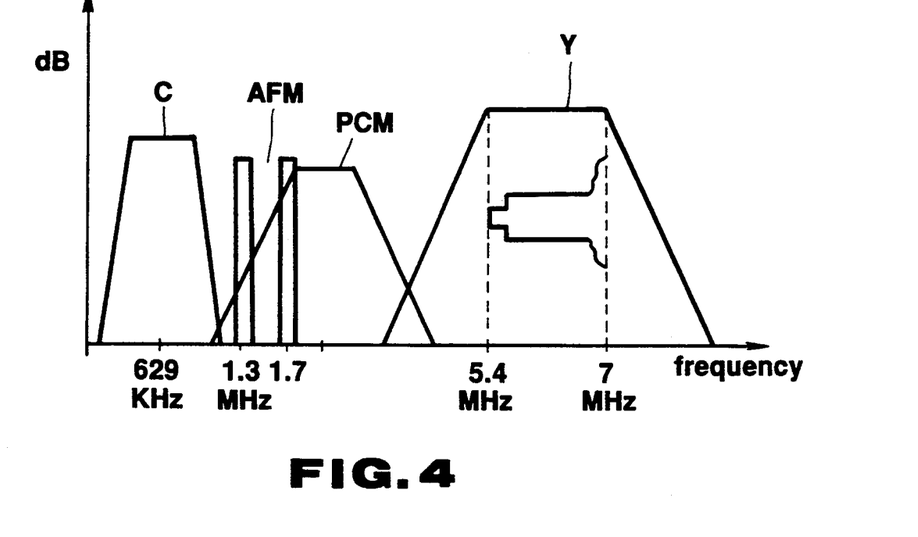
FIG. 4 is a view which shows the frequency spectrum of video and audio signals recorded on a magnetic tape.

A video tape recorder (VTR) for recording and/or reproducing a color video signal and an audio signal has been proposed wherein the video signal is separated into a low frequency-converted chrominance signal and a frequency modulated luminance signal to be recorded on, and reproduced from a magnetic tape, while the audio signal is frequency modulated to be recorded on the magnetic tape and reproduced therefrom. In such a VTR, for example, a left channel signal and a right channel signal included in a stereo audio signal frequency modulate two carrier waves having frequencies different from each other to provide a left audio frequency modulated signal (L-AFM signal) and a right audio frequency modulated signal (R-AFM signal). The frequency bands of these L-AFM and R-AFM signals are situated between the frequency-converted chrominance signal frequency band and the frequency modulated luminance signal frequency band. For example, as shown in FIG. 4, the carrier frequencies of the L-AFM and the R-AFM signals may be 1.3 MHz and 1.7 MHz, respectively.

Another type of VTR is well known in which an audio signal is converted into pulse code modulated (PCM) digital data to be recorded on the magnetic tape, and the digital audio signal is reproduced prior to being digital/analog converted to an analog audio signal in order to improve tone quality. In this type of VTR, the PCM digital data is modulated according to quadriphase shift keying (QPSK) so as to obtain a QPSK modulated signal. The frequency band of such QPSK modulated signal is also provided between the frequency converted chrominance signal frequency band and the frequency modulated luminance signal frequency band, as shown in FIG. 4. In such case, the central frequency of the QPSK modulated signal may be 2 MHz. These audio frequency modulated signals (AFM) including a left AFM signal and a right AFM signal, or the QPSK modulated audio signal are recorded by rotary heads independent of the rotary heads used for recording video signals on a track area of the magnetic tape common to that used for the video signals. The video signals are recorded in a surface layer of the magnetic tape, while the QPSK modulated signals, or the AFM signals, are recorded in a deeper layer of the magnetic tape.

In order to reproduce such signals recorded at different levels in the magnetic coating on the tape, independent rotary video signal heads and rotary audio signal heads are provided to reproduce the video signals and the AFM or QPSK modulated signals, respectively. The reproduced video signals are supplied to a video signal reproducing system provided in the VTR, while the reproduced AFM or QPSK modulated signals are supplied to an audio signal reproducing system.

However, existing VTRs including an AFM signal reproducing system and existing VTRs including a QPSK modulated signal reproducing system are independent of each other. Thus, information signals including AFM signals and QPSK modulated signals cannot be reproduced by a single existing VTR. Further, users cannot readily discriminate between a magnetic tape in which AFM signals are recorded and a magnetic tape in which QPSK modulated signals are recorded. This causes great inconvenience in determining the type of VTR to be used for reproducing a magnetic tape recorded with video signals and AFM or QPSK modulated signals.

OBJECTS AND SUMMARY OF THE INVENTION

Accordingly, it is an object of the present invention to provide an apparatus for recording and/or reproducing information signals on a magnetic tape, and in which such information signals include first and/or second signals having different frequencies, such as, for example, an FM modulated signal and/or a PCM signal.

More specifically, it is an object of this invention to provide an apparatus for recording and/or reproducing information signals, as aforesaid, and which detects the type or types of recorded signals and automatically selects appropriate reproducing circuits therefor.

According to one aspect of the present invention, there is provided an apparatus which comprises reproducing means for reproducing information signals recorded in a recording medium and which include at least one of first and second signals having different first and second formats, respectively; first detecting means for detecting the first signal in the information signals and being operative to provide a first detecting signal indicative of the presence of the first signal; second detecting means for detecting the second signal in the information signals and being operative to provide a second detecting signal indicative of the presence of the second signal; signal output means; switching means for selectively supplying the first signal and the second signal from the reproducing means to the signal output means; and control means for controlling the switching means in response to the first and second detecting signals to selectively output the first signal or the second signal through the signal output means.

According to another aspect of the invention there is provided an apparatus for recording and/or reproducing information signals which comprises recording means for recording on a recording medium information signals including first, second and third signals having first, second and third frequencies which are different from each other; reproducing means for reproducing the information signals from the recording medium; first detecting means for detecting the first signal in the information signals and being operative to provide a first detecting signal indicative of the presence of the first signal; second detecting means for detecting the second signal in the information signals and being operative to provide a second detecting signal indicative of the presence of the second signal; signal output means; switching means for selectively supplying the first signal and second signal from the reproducing means to the signal output means; .and control means for controlling the switching means in response to the first and second detecting signals to selectively output the first and third signals and the second and third signals through the signal output means.

According to still another aspect of the invention, there is provided a video tape recorder which comprises signal source means for providing a first information signal, a second information signal and a third information signal; first rotary magnetic head means for recording the first information signal with a first recording current of a predetermined value in a relatively deep layer within a magnetic coating of a magnetic tape; second rotary magnetic head means for recording the second information signal with a second recording current in a second layer of the magnetic coating, the magnitude of such second recording current being less than that of the first recording current so that the second layer is at a depth in the magnetic coating less than the depth of the first layer; and third rotary magnetic head means for recording the third information signal with a third recording current in a third layer of the magnetic coating, the magnitude of the third recording current being less than that of the second recording current so that the third layer is at the surface of the magnetic coating of the magnetic tape.

According to a further aspect of the invention, there is provided a quadri differential phase shift keying modulating circuit which comprises a separating circuit for separating an input PCM information signal into a first data stream and a second data stream; a first balanced modulator for receiving the first data stream; a second balanced modulator for receiving the second data stream; carrier supply means for supplying first and second carriers to the first and second balanced modulators, respectively, with the phase of the second carrier being shifted by 90 degrees relative to the first carrier; adding means for adding an output signal from the first balanced modulator to an output signal from the second balanced modulator; and a band-pass filter having a predetermined pass band and receiving an output sum signal from the adding means.

The above, and other objects, features and advantages of the invention, will be apparent in the following detailed description of a preferred embodiment which is to be read in connection with the accompanying drawings wherein corresponding elements are identified by the same reference numerals in the several views.

DESCRIPTION OF THE PREFERRED EMBODIMENT

Figure 1:
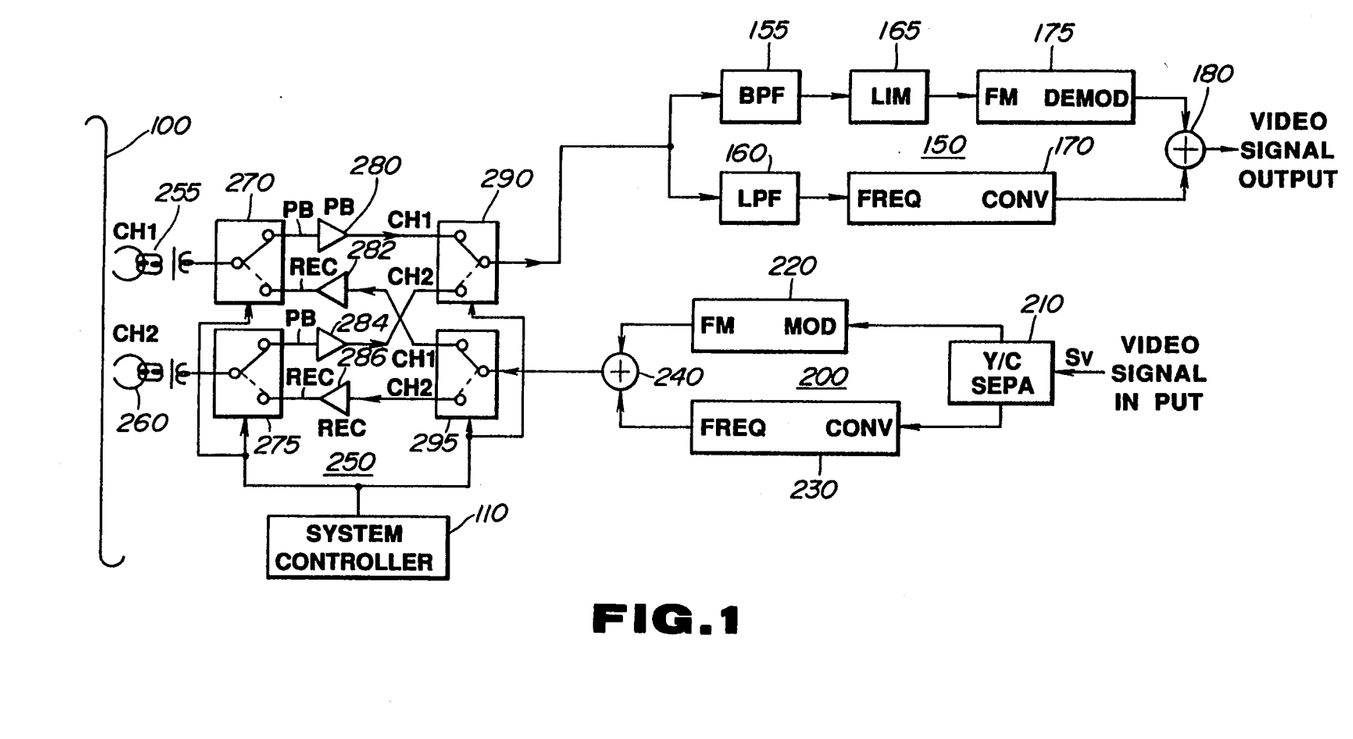
FIG. 1 is a schematic block diagram which shows a video signal recording and reproducing system that can be incorporated in an apparatus for recording and/or reproducing information signals according to an embodiment of the present invention.

Referring to the drawings in detail, and initially to FIG. 1, it will be seen that a video signal recording and reproducing system for a video tape recorder (VTR) according to the present invention generally comprises a video reproducing or playback section 150 and a video recording section 200. The recording section 200 is shown to include a Y/C separator 210, an FM modulator 220, a frequency converter 230, and an adder 240. A composite color video signal $S_V$ is supplied from an input terminal to the Y/C separator 210 where it is separated into a luminance component Y and a chrominance component C. The luminance component Y is supplied to the FM modulator 220 wherein the relatively higher frequency components thereof are eliminated prior to being frequency modulated to an FM component having a frequency band indicated at Y in FIG. 4, while the chrominance component C is supplied to the frequency converter 230 to be frequency-converted down to a relatively low frequency band indicated at C in FIG. 4.

The frequency-modulated luminance component Y and the frequency-converted chrominance component C are superimposed, as by supplying both components to the adder 240. The added together components are recorded in an oblique or slant track on a magnetic tape 100 through a video head unit 250, with each track containing one field of the video signal.

The video head unit 250 generally comprises rotary magnetic heads 255 and 260 serving as a first channel CH-1 and a second channel CH-2, respectively, record/playback switching circuits 270 and 275, playback amplifiers 280 and 284, recording amplifiers 282 and 286 and change-over switching circuits 290 and 295. The rotary magnetic heads 255 and 260 are disposed at diametrically opposed locations on the periphery of a rotary head drum (not shown). Each of the record/playback switching circuits 270 and 275 is operable to be changed over between a playback contact PB connected to the playback amplifier 280 or 284 and a record contact REC connected to the record amplifier 282 or 285, that is, between the position shown by solid lines and the position shown by dotted lines in FIG. 1, in response to a signal output from the system controller 110. According to this switching operation, each of the rotary magnetic heads 255 and 260 serves alternately to record a signal on, or playback a signal from the magnetic tape 100. The change-over switching circuits 290 and 295 are adapted to be changed-over between respective contacts CH-1 connected through switching circuit 270 to the rotary magnetic head 255 and respective contacts CH-2 connected through the switching circuit 275 to the rotary magnetic head 260. In other words, the switching circuits 290 and 295 are changed-over between the positions shown by solid lines and the positions shown by dotted lines in FIG. 1 at each half revolution of the rotary magnetic heads in response to a signal from the system controller 110. Accordingly, during a recording operation, the signals formed by mixing the luminance and the chrominance components in the adder 240 are supplied to the magnetic heads 255 and 260, alternatively, according to the switching operation of the change-over switching circuit 295 to be recorded on the magnetic tape 100.

The video signal reproducing section 150 comprises a luminance channel for extracting the frequency-modulated luminance component from reproduced video signals and for demodulating this component so as to return it to its original frequency range, a chrominance channel for extracting the frequency-converted chrominance component from reproduced video signals and for frequency re-converting this component back to its original frequency range, and an adder or mixer 180. The luminance channel includes a band-pass filter 155, a limiter 165, and an FM demodulator 175. The chrominance channel includes a low-pass filter 160, and a frequency converter 170.

During a reproducing or playback operation, composite video signals including luminance components Y and chrominance components C are reproduced by the rotary magnetic heads 255 and 260 from the magnetic tape 100. The composite signals are transmitted to the band-pass filter 155 and the low-pass filter 160 through the switching circuits 270 and 275, the playback amplifiers 280 and 284, and the switching circuit 290. The band-pass filter 155 then separates the luminance component Y from the reproduced composite signal and supplies it to the FM demodulator 175 through the limiter 165. The FM demodulator serves to demodulate the frequency-modulated signal so as to recover the original luminance component therefrom.

On the other hand, the low-pass filter 160 separates the frequency-converted chrominance component C from the reproduced composite video signal to supply it to the frequency converter 170. The frequency converter 170 modulates the separated chrominance component to its original frequency range prior to being applied to the adder 180. The adder combines the demodulated luminance component from the FM demodulator 175 with the modulated chrominance component from the frequency converter 170 to provide a composite output video signal.

Figure 2:
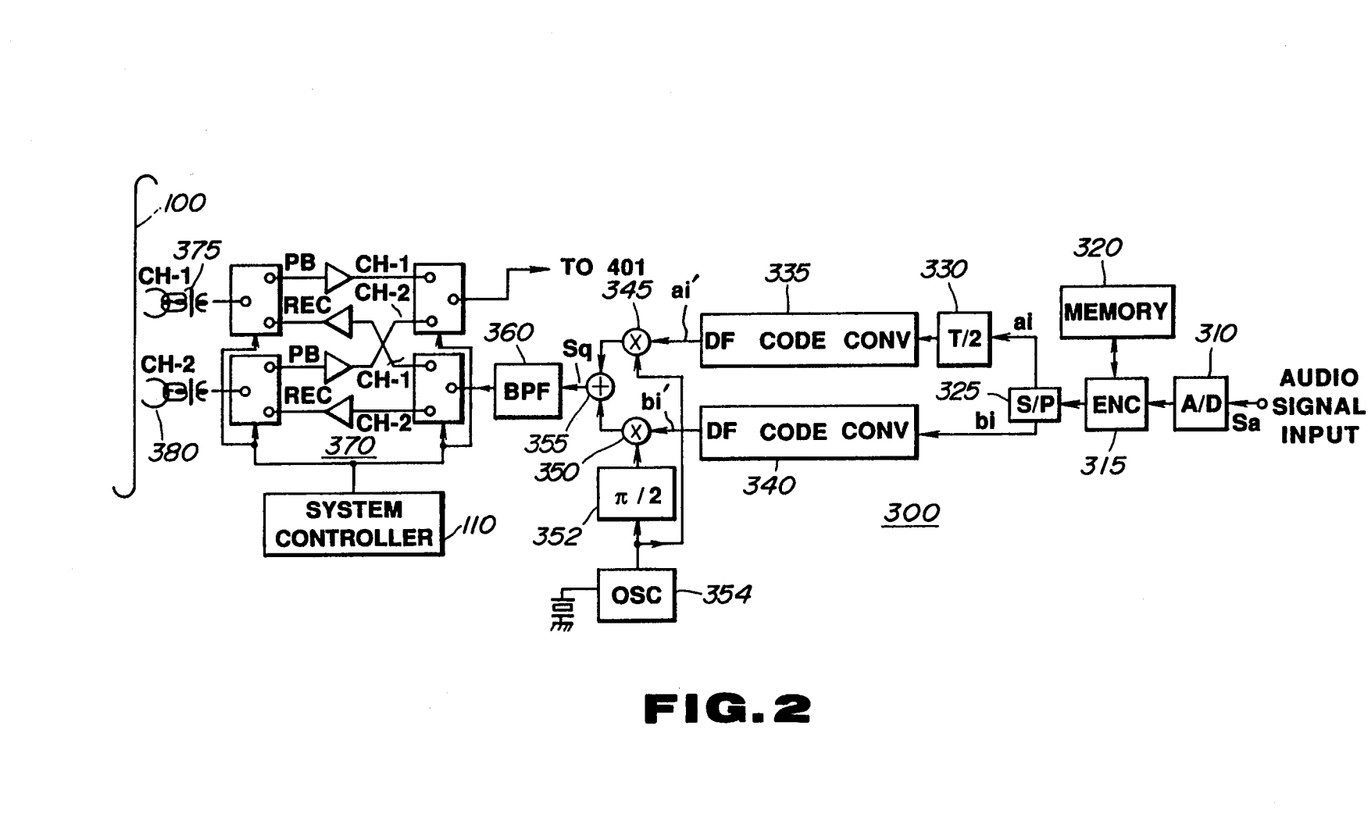
FIG. 2 is a schematic block diagram which shows a PCM audio signal recording system employing O-QDPSK modulation.

Referring now to FIG. 2, it will be seen that a PCM audio signal recording system 300 according to offset-quadri differential phase shift keying (hereinafter referred to as an (O-QDPSK) includes an A/D converter 310, an error-correcting encoder 315, a memory circuit 320 for the error-correcting encoder, a serial-to-parallel converter 325, a delay circuit 330, differential code converters 335 and 340, balanced modulators 345 and 350, a phase shift circuit 352, an oscillator 354, an adder circuit 355, a band-pass filter 360, and a PCM head unit 370. The PCM head unit 370 is adapted for PCM audio signal recording and reproducing and its structure and operation are similar to what has been described for the video head unit 250 so that further description of the PCM head unit 370 will be omitted.

When an audio signal Sa is supplied to the A/D converter 310, it is converted into a PCM audio signal and then supplied to the error-correcting encoder 315. The encoder 315 adds an error correcting code to the PCM audio signal. This corrected PCM audio signal is then input to the serial-to-parallel converter 325 as a pair of data streams (ai, bi). This pair of data streams is divided into a data stream ai of odd bits and a data stream bi of even bits. The stream ai is supplied to the delay circuit 330 to be delayed, or offset by 0.5 T, where T is the signaling interval. The offset signal is supplied from delay circuit 330 to the differential code converter 335 to be converted into a differential data stream ai', while the data stream bi is supplied to the differential code converter 340 to be converted into a differential data stream bi'. This conversion is such that, if there is a change from one bit to the next in this series of data, for example, if a bit changes from 1 to 0 or from 0 to 1, a corresponding bit of differential data is assigned a value of 1. If a bit does not change in the series of data, a corresponding bit of differential data is assigned a value of 0. U.S. Pat. No. 4,804,925, entitled DPSK EXCLUSIVE-OR DEMODULATOR which has been granted to Iwase et al., and assigned to Fuji Photo Film Co., Ltd., discloses such a conversion, and the disclosure thereof is incorporated herein by reference.

These differential data streams ai' and bi' are supplied to the balanced modulators 345 and 350, respectively. The oscillator 354 provides a cos$\omega$ct signal to the balanced modulator 345 and the phase shift circuit 352. The phase shift circuit 352 provides a sin$\omega$ct signal by shifting the phase of the cos$\omega$ct signal by $\pi/2$. The differential data stream ai' is modulated to a cos($\omega$ct+ai'$\pi$) signal, while the differential data stream bi' is modulated to a sin($\omega$ct+bi'$\pi$) signal. These cos($\omega$ct+ai'$\pi$) and sin($\omega$ct+bi'$\pi$) signals are input to the adding circuit 355 to provide an O-QDPSK modulated signal Sq expressed by the following formula.

$$\cos(\omega ct+ai')+\sin(\omega ct+bi')=\sqrt{2}\cos[\omega ct-\tan^{-1}(\cos bi'\pi/\cos ai'\pi)] \quad (1)$$

where the data streams (ai', bi') correspond to four kinds of data (0, 0), (1, 0), (1, 1), and (0, 1). Substituting these data in the term $\tan^{-1}(\cos bi'\pi/\cos ai'\pi)$ of the above formula (1), that term is expressed as follows:

$$\tan^{-1}(\cos bi'\pi/\cos ai'\pi)=\pi/4\times k$$

(k=1, 3, 5, or 7)

It will be noted that, if corresponding bits in the data streams ai' and bi' are equivalent to 0 and 0, the value of the above term is $\pi/4$; if corresponding bits in the data streams ai' and bi' are equivalent to 1 and 0, the value of the above term is $3\pi/4$; if corresponding bits in the data streams ai' and bi' are equivalent to 1 and 1, the value of the above term is $5\pi/4$; and if corresponding bits in the data streams ai' and bi; are equivalent to 0 and 1, the value of the above term is $7\pi/4$. Thus, the value of the formula (1) represents one of four points which are shifted from each other by $\pi/2$ according to the value of corresponding bits in the data streams ai' and bi'.

In a conventional PCM audio signal recording system, two low pass filters are interposed between the serial-to-parallel converter and the balanced modulators, respectively. Each filter limits frequency of the PCM signal output from the serial-to-parallel converter to a passing band of 1 MHz to 3 MHz. The power spectrum of a PCM audio signal has relatively high frequency components. These components are eliminated by the low pass filters. Therefore, for example, if corresponding bits of data streams ai' and bi' are equivalent to 1 and 0, the ai' bit tends to become smaller than 1 after passing the respective low pass filter as a result of the elimination of the high frequency components. The value of $\tan^{-1}(\cos bi'\pi/\cos ai'\pi)$ therefore becomes somewhat smaller than $3\pi/4$, causing a phase error to occur at this point. This results in an increased error rate rendering difficult the recording of PCM audio data.

Figure 3:
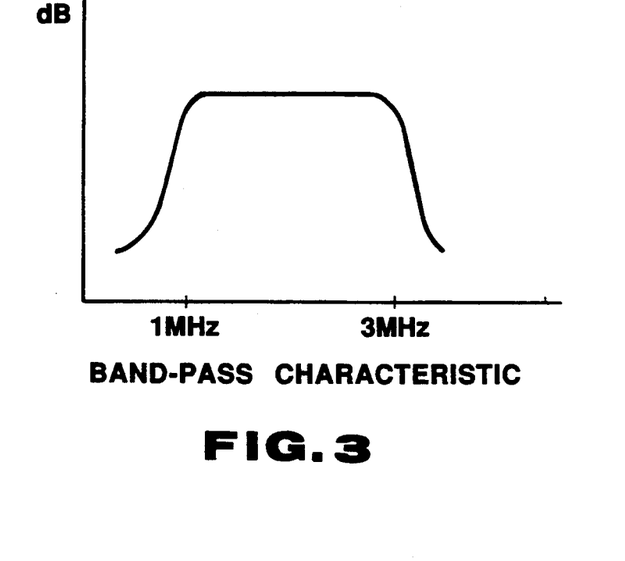
FIG. 3 is a graph which shows the band-pass characteristics of a band-pass filter used in the system of FIG. 2.

According to the present invention, the two low pass filters are replaced by a single band-pass filter 360. The O-QDPSK modulated signal Sq is fed to the band-pass filter 360 from the adding circuit 355. The band-pass filter 360 has the frequency characteristic shown on FIG. 3 so as to be adapted to restrict the O-QDPSK modulated signal Sq to a specific frequency band which, as shown in FIG. 4, is defined between the frequency bands of the luminance component Y and the chrominance component C and therefore is limited in a bandwidth approximately from 1 MHz to 3 MHz.

The filtered signal is supplied to the PCM head unit 370 to be recorded by rotary magnetic heads 375 and 380 in slant tracks on the magnetic tape 100 with each slant track containing one field of the video signal.

In the above described embodiment of the invention, the band-pass filter 360 is provided after the balanced modulators 345 and 350. Thus, accurate O-QDPSK modulation is obtained without phase error as mentioned above allowing PCM audio data of a reduced error rate to be recorded. Further, since the described PCM audio signal recording system uses one band pass filter in place of the two low pass filters of the conventional systems, the manufacturing cost of the VTR is decreased.

Figure 5:
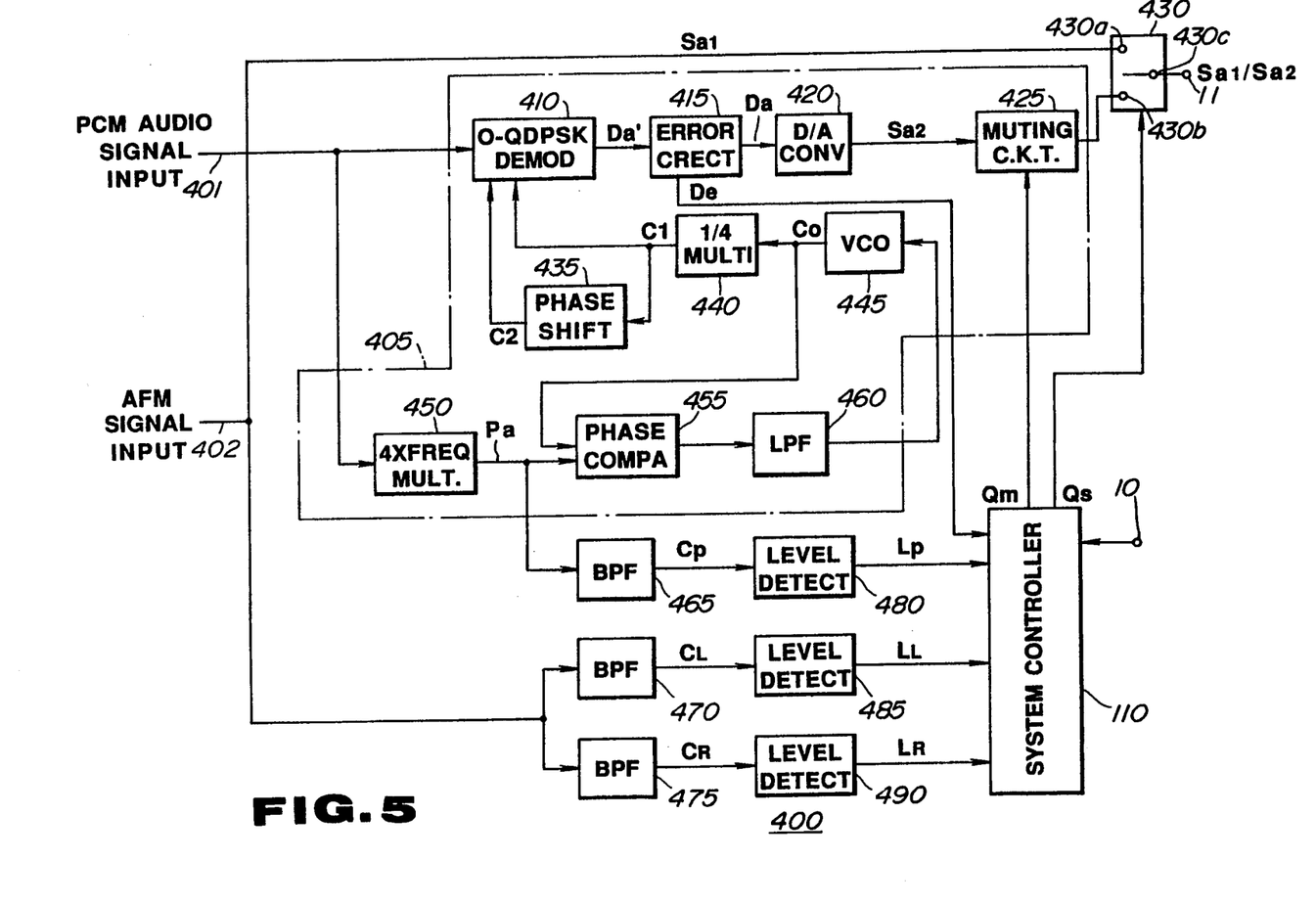
FIG. 5 is a schematic block diagram which shows both FM and PCM audio signal reproducing systems incorporated in an apparatus for recording and/or reproducing information signals according to an embodiment of the present invention.

A system 400 according to this invention for reproducing either frequency modulated (FM) audio signals or pulse code modulated (PCM) audio signals will now be described with reference to FIG. 5. The system 400 is adapted to identifying whether audio signals picked up by the rotary magnetic heads from the magnetic tape 100 are frequency modulated, or FM, audio signals or are the above described O-QDPSK modulated PCM audio signals and then to reproduce them appropriately. An FM audio signal, the recording of which will be described in detail later, is input to the system 400 from an input line 402 as left and right AFM signals, while a PCM audio signal is input to the system 400 from an input line 401.

A PCM audio signal appearing on the input line 401 is split and supplied to an O-QDPSK demodulator 410 and a 4X-frequency multiplier 450 which are incorporated in a PCM audio signal reproducing section 405. The 4X-frequency multiplier 450 multiplies the frequency of the received signal by four to provide a signal having a fundamental frequency of 8 MHz which is supplied to a phase shift comparator 455 and a band-pass filter 465. The filter 465 has a relatively narrow pass band with a central frequency of 8 MHz. The output $C_P$ of the band-pass filter 465 is supplied to a level detector 480 which provides a corresponding detected output signal $L_P$ of relatively high level to the system controller 110.

An AFM audio signal input from the line 402 is also split, with one branch being supplied to a contact 430a of a switch 430, the function of which will be explained later, and the other branch being split again to be supplied to band-pass filters 470 and 475. The band-pass filter 470 has a pass band with a central frequency of 13. MHz corresponding to that of the left AFM signal, as shown in FIG. 4, while the band-pass filter 475 has a pass band central frequency of 1.7 MHz corresponding to that of the right AFM signal. The band-pass filters 470 and 475 provide signals $C_L$ and $C_R$ to level detectors 485 and 490, respectively. These level detectors respectively provide detected output signals $L_L$ and $L_R$ of relatively high levels to the system controller 110.

It will be noted that, if PCM audio signals are recorded on the magnetic tape 100, the band-pass filter 465 provides the signal $C_P$ to the level detector 480, while the band-pass filters 470 and 475 provide no signals to the level detectors 485 and 490, respectively. Therefore, the level detector 480 provides a high level signal $L_P$ to the system controller 110, while the level detectors 485 and 490 provide signals $L_L$ and $L_R$ of relatively low levels. Alternatively, if an AFM signal is recorded on the magnetic tape 100, the band-pass filter 465 provides no signal to the level detector 480, while the band-pass filters 470 and 475 provide the signals $C_L$ and $C_R$ to the level detectors 485 and 490, respectively. The level detector 480 accordingly provides a signal $L_P$ having a low level to the system controller 110, while the level detectors 485 and 490 provide high level signals $L_L$ and $L_R$ thereto.

Further, if both AFM and PCM signals are recorded on the magnetic tape 100, the band-pass filters 465, 470, and 475 provide the signals $C_P$, $C_L$, and $C_R$ to the level detectors 480, 485 and 490, respectively. These level detectors all output high level signals $L_P$, $L_L$ and $L_R$ to the system controller 110. In this case, the system controller 110 determines whether to reproduce the AFM audio signal or the PCM audio signal based on a so-called reproduction mode signal supplied through a line 10, as will be explained below.

Such reproduction mode signal, which may indicate an AFM reproducing mode or a PCM reproducing mode, may be applied to the line 10 from a user actuated switch (not shown) which is manually switchable between positions corresponding to an AFM reproducing mode and a PCM reproducing mode. When the AFM reproducing mode signal is input, or during an AFM signal reproducing operation when the level detector 480 provides a low level $L_P$ signal and the level detectors 485 and 490 provide high level $L_L$ and $L_R$ signals, the system controller 110 outputs a signal $Q_S$ at a high level. However, if the switch is manually set to cause the PCM reproducing mode signal to be input to the controller 110, but the VTR is not engaged in a PCM reproducing operation, in other words, the PCM reproducing mode signal is provided but non-PCM (AFM) program material is currently being played in the VTR, so that the level detector 480 is providing a low level signal $L_P$ and the level detectors 485 and 490 are providing high level signals $L_L$ and $L_R$, the system controller 110 will still output a high level signal $Q_S$.

Similarly, during a PCM reproducing operation in which the level detector 480 provides a high level signal $L_P$ to the system controller 110, the latter will output a signal $Q_S$ having a relatively low level even if the reproducing mode signal applied to input line 10 is an AFM reproducing mode signal. In other words, a VTR according to the invention will automatically determine whether the magnetic tape 100 being reproduced contains AFM or PCM data and will assume the appropriate reproducing mode, if necessary overriding the setting of the reproducing mode signal received through input line 10.

The signal $Q_S$ output from the system controller 110 is supplied as a control signal to the switching circuit 430. When the level of the signal $Q_S$ is low, a movable contact 430c of the switching circuit 430 engages a contact 430b connected with the O-QDPSK audio signal reproducing system 405, whereas, when the level of the signal $Q_S$ is high, the movable contact 430c engages the contact 430a connected to the AFM signal input line 402.

However, in a case where both AFM and PCM data are recorded on a magnetic tape 100 undergoing playback, when the AFM signal reproducing mode signal is input at line 10 to establish the AFM signal reproducing mode, only the left and right AFM signals will be reproduced. In such case, the movable contact 430c is engaged with the contact 430a to supply the AFM audio signal input from the line 402 to an audio signal output terminal 11 from which the AFM signal is then reproduced by loud speakers (not shown) through an amplifier or the like.

On the other hand, when the PCM signal reproducing mode signal is input at line 10 to establish the PCM reproducing mode, only PCM audio signals will be reproduced. In other words, even if the magnetic tape 100 has both PCM and AFM audio signal recorded thereon, in the presence of the PCM reproducing mode signal the movable contact 430c will be engaged with the contact 430b, whereby the PCM audio signal will pass from the PCM or O-QDPSK audio signal reproducing system 405 to the output terminal 11 to be reproduced by loudspeakers (not shown) through an amplifier or the like.

The PCM or O-QDPSK audio signal reproducing system is shown to generally include an O-QDPSK modulator 410, an error correcting circuit 415, a D/A converter 420, a muting circuit 425, a phase shifter 435, a ¼ frequency multiplier 440, a voltage controlled oscillator 445, the phase comparator 455, a low pass filter 460, and the 4X-frequency multiplier 450. The 4X-multiplied signal Pa having a central frequency of 8 MHz after passing the multiplier 450, as described above, is supplied to the band-pass filter 465 and to one of input terminals of the phase comparator 455. The phase comparator 455 is part of a phase-locked loop (PLL) which further includes the low pass filter 460, and the voltage controlled oscillator 445, which has a central oscillation frequency of 8 MHz and is controlled by the signal output from the low pass filter 460 to provide an oscillation output signal Co to another input terminal of the phase comparator 455. The phase comparator 455 compares the phase of the 4X-multiplied signal Pa with that of the oscillator 445 to provide an output signal indicative of the relative phases to the voltage controlled oscillator 445 through the low pass filter 460 as the oscillation frequency control voltage. It will be noted that, in the stationary state, the frequency of the oscillation output signal of the voltage controlled oscillator 445 corresponds to that of the 4X-multiplied signal Pa, their frequencies both being 8 MHz.

The oscillator output signal Co having an 8 MHz frequency is supplied from the voltage controlled oscillator 445 to the ¼ multiplier 440 to be reduced to ¼ its original frequency. Therefore, the ¼ multiplier provides a signal C1 having a frequency of 2 MHz. It will be appreciated that a carrier signal having a frequency of 2 MHz is provided based on the O-QDPSK modulated signal of the audio signal read out from the magnetic tape. The carrier C1 is supplied to the phase shifter 435 to be shifted by $\pi/2$ and thereby provide a carrier C2 having a phase difference of $\pi/2$ relative to the phase of carrier C1. Carriers C1 and C2 obtained in the above manner are fed to the O-QDPSK demodulator 410.

The O-QDPSK demodulator 410 demodulates the O-QDPSK modulated audio signal fed from the input line 401 using the carriers C1 and C2 according to the typical O-QDPSK demodulation process well known in the art to provide PCM audio digital data Da'.

The data Da' from the O-QDPSK demodulator 410 is supplied to the error correcting circuit 415 for error correction. The error correcting circuit 415 provides the error-corrected PCM audio digital data Da to the D/A converter 420 and further provides an error rate signal De indicative of the error rate in the PCM audio digital data to the system controller 110. The system controller 110 outputs a muting control signal Qm to the muting circuit 425 when the error rate indicated by the error rate signal De is greater than or equal to a reference value.

The error corrected PCM audio digital data Da is supplied to the D/A converter 420 to be converted to an audio analog signal $S_{a2}$ and then output to the muting circuit 425. The muting circuit 425 is operable to mute the audio analog signal $S_{a2}$ in response to the muting control signal Qm from the system controller 110. Thus, when no muting control signal Qm is applied to the muting circuit 425, or when the error rate indicated by the error rate signal De is smaller than the reference value, the audio signal $S_{a2}$ appears at the audio signal output terminal 11 through the muting circuit 425 and the switching circuit 430.

It will be appreciated that the FM and PCM audio signal reproducing system 400 according to this invention is operable to automatically identify the kind of recording method used for audio signals recorded on a magnetic tape and to reproduce them appropriately.

Figure 6:
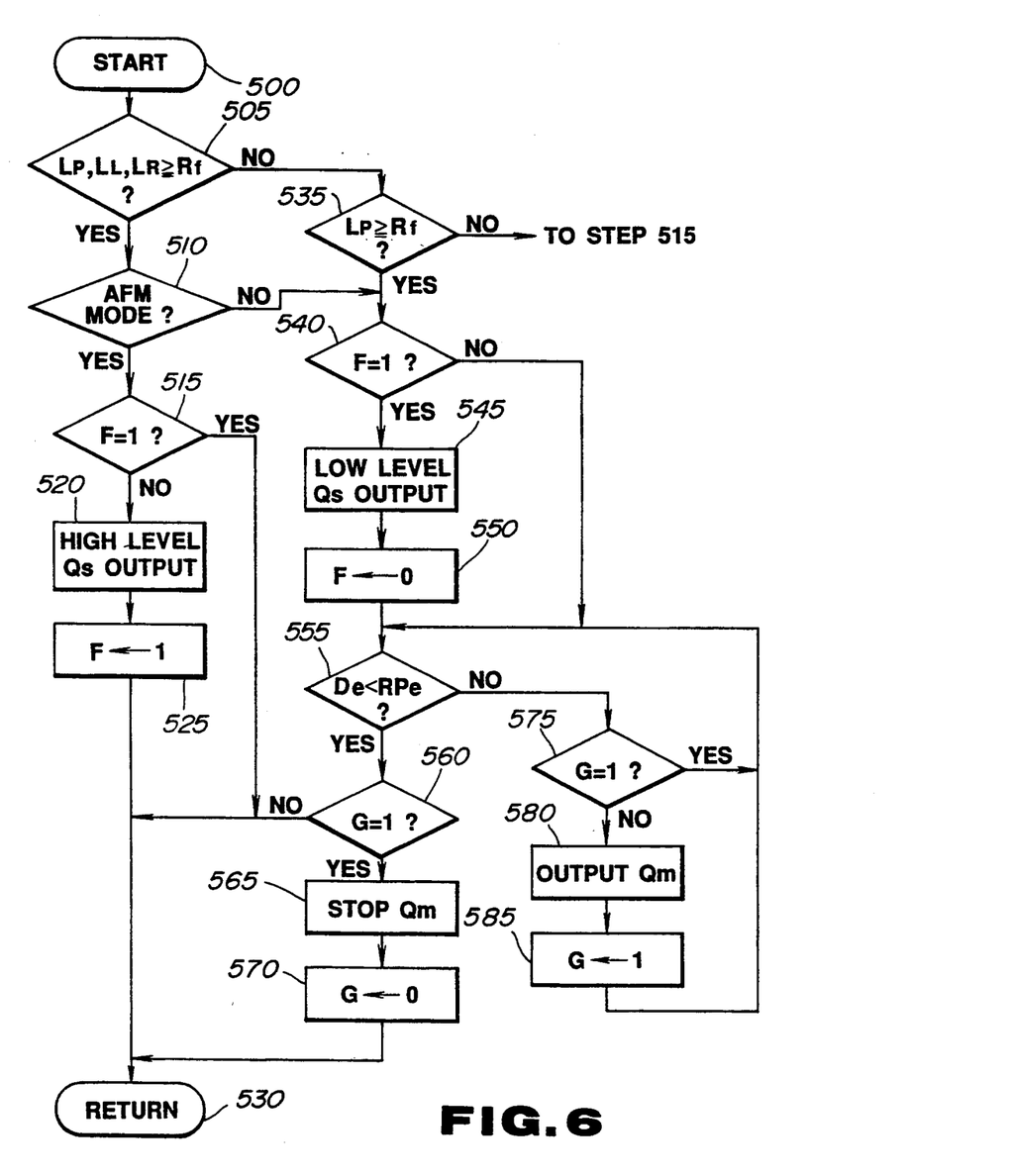
FIG. 6 is a flowchart which shows a program or sequence of logical steps for controlling the FM and PCM audio signal reproducing systems shown in FIG. 5.

A program or sequence of logical steps performed by the system controller 110, which may be a microcomputer, for example, will now be described with reference to the flow chart of FIG. 6.

After initiation of the program at a step 500, the routine proceeds to a decision step 505 in which it is determined whether the levels of the output signals $L_P$, $L_L$ and $L_R$ from all of the level detectors 480, 485 and 490 are higher than the reference value or not. If a YES answer is obtained at step 505, the routine proceeds to a decision step 510 in which it is determined whether or not the AFM signal reproducing mode is in effect. If a YES answer is obtained at step 510, the routine proceeds to a decision step 515 in which it is determined whether or not a flag F is 1. If flag F is not 1, that is, F=0, the routine proceeds to a step 520 in which the control signal $Q_S$ having a high level is output to the switching circuit 430 to engage the movable contact 430c with the contact 430a. The routine then goes to a step 525 in which the flag F is assigned a value of 1, whereupon, the routine proceeds to a step 530 in which a return is effected to the step 500.

If in step 510 a NO answer is obtained, that is, the AFM signal reproducing mode is not in effect, the routine proceeds from step 510 to a decision step 540 in which it is determined whether or not a flag F is 1. If a YES answer is obtained at step 540, that is, F=1, a step 545 is next executed in which a control signal $S_S$ having a low level is output to the switching circuit 430 to engage the movable contact 430c with the contact 430b. The routine then goes to a step 550 in which the flag F is assigned a value of 0, and the routine goes to the next decision step 555. Alternatively, if in step 540 the flag F is not 1, that is, F=0, the routine goes directly from step 540 to step 555.

In decision step 555, it is determined whether or not the error rate indicated by the error rate signal De from the error correcting circuit 415 is smaller than a reference error rate value RPe. If a YES answer is obtained, a step 560 is next executed in which it is determined whether or not a flag G is 1. If the answer is YES, that is, G=1, a muting control signal Qm is output to the muting circuit 425, whereupon, in the next step 565 the output of the muting control signal Qs is stopped. The routine then goes to a step 570 in which the flag G is assigned a 0 value and then to the step 530 for return to the step 500. Alternatively, if a NO answer is obtained in the step 560, that is, the flag G=0, the routine proceeds directly to the step 530 for return to the start in step 500.

Alternatively, if in step 555, the error rate De is determined to be greater than or equal to the reference error rate RPe, the routine goes to a decision step 575 in which it is determined whether or not the flag G is 1. If the answer is NO at step 575, the routine goes to a step 580 which initiates the output of a muting control signal Qm. A step 585 is next executed in which the flag G is assigned a value of 1 and then the routine is returned to the step 555. Alternatively, if in step 575 a YES answer is obtained, that is, G=1, the routine is directly returned to the step 555.

On the other hand, if in step 505, it is determined that at least one of output signals $L_P$, $L_L$ and $L_R$ is not greater than or equal to the reference value $R_f$, the routine goes to a decision step 535 in which it is determined whether or not the output signal $L_P$ is equal to or higher than the reference value $R_f$. If a YES answer is obtained at step 535, the routine goes to the step 540. If a NO answer is obtained at step 535, that is, if $L_P<R_f$, the routine goes to step 515.

The above described embodiment is directed to a VTR for reproducing information signals that were recorded on a magnetic tape as O-QDPSK modulated signals and/or as AFM signals. However, the present invention is not limited only to these types of signals. In other words, information signals other than O-QDPSK type modulated signals and AFM type signals may be appropriately reproduced by an apparatus according to the invention.

As is clear from the above description, the frequency modulated audio signal and PCM audio signal reproducing systems according to the present invention can automatically identify various kinds of modulated signals recorded on magnetic tape and reproduce them appropriately. Therefore, systems according to the invention are applicable to magnetic tape on which either FM audio signals or PCM audio signals, or a combination of both FM and PCM audio signals have been recorded so as to reproduce such recorded audio signals.

Figure 7:
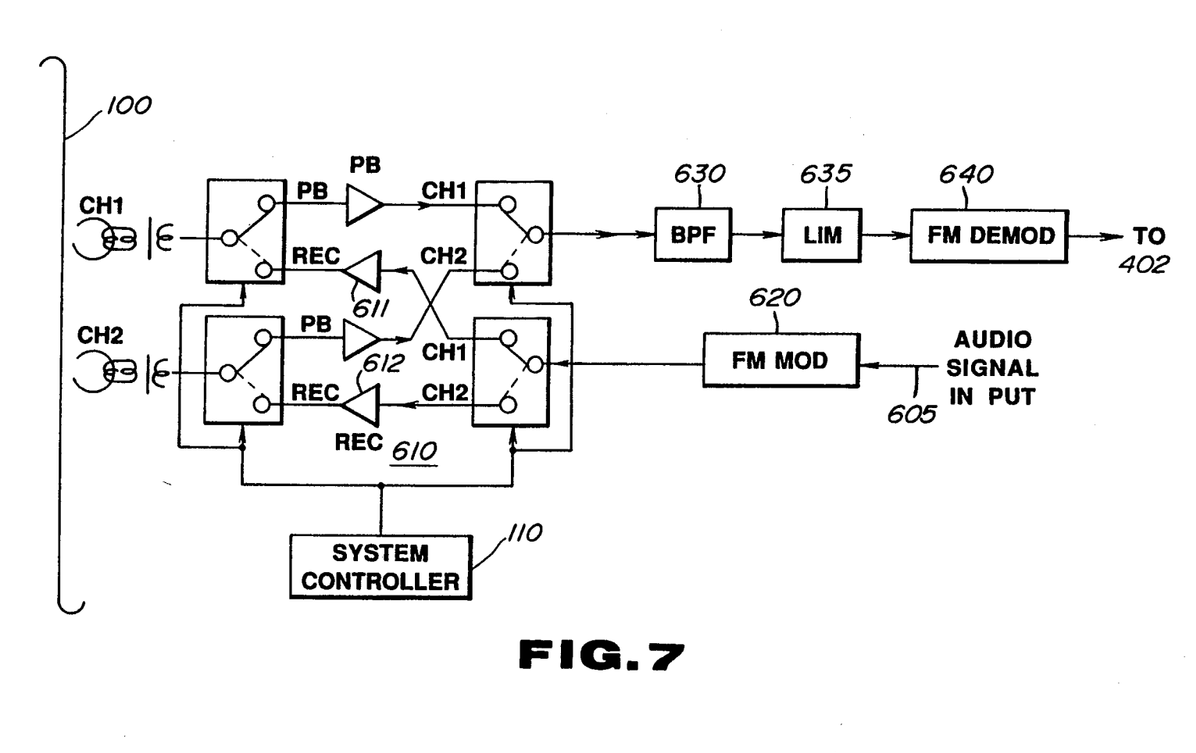
FIG. 7 is a schematic block diagram which shows an FM audio signal recording and reproducing system that may be incorporated in an apparatus for recording and/or reproducing information signals according to the invention.

Referring now to FIG. 7, it will be seen that, an FM audio signal recording and reproducing system employed in accordance with this invention may include an FM modulator 620 adapted for modulating an audio signal input from an input line 605 to left AFM and right AFM signals having frequency bands as shown in FIG. 4. These modulated AFM signals are recorded in one track corresponding to one field on the magnetic tape 100 by means of an AFM head unit 610. The structure and function of the head unit 610 are similar to those of the above described video head unit 250 and thus a further explanation of the unit 610 will be omitted.

An FM audio signal reproducing section of the system is shown to include a band-pass filter 630, a limiter 635, and an FM demodulator 640. Fm modulated audio signals including the left AFM signal and the right AFM signal which are recorded on the tape 100 as described above are read out by the FM head unit 610 and applied therefrom to the band-pass filter 630, the limiter 635, and the FM demodulator 640, whereupon the resulting AFM signals are applied to the input line 402 on FIG. 5 to be reproduced by the above described FM and PCM audio signal reproducing system according to this invention.

A signal recording system according to this invention for recording video, PCM, and/or FM signals will now be described in detail with reference to FIG. 8.

Such signal recording system according to the invention may have various operating modes in which it is selectively operative to record one or more of a video signal, a PCM audio signal (an O-QDPSK signal) and an FM audio signal, for example, as indicated in Table I below. For example, in recording mode A, all of the video, PCM and FM signals can be recorded on the magnetic tape, in recording modes B to D, only those two signals indicated at [0] can be recorded on the tape, and in each of recording modes E to G, only one signal indicated at [0] can be recorded on the tape.

TABLE I

| MODE | VIDEO SIGNAL | PCM SIGNAL | FM SIGNAL |
|---|---|---|---|
| A | 0 | 0 | 0 |
| B | 0 | 0 | X |
| C | 0 | X | 0 |
| D | X | 0 | 0 |
| E | 0 | X | X |
| F | X | 0 | X |
| G | X | X | 0 |

Figure 8:
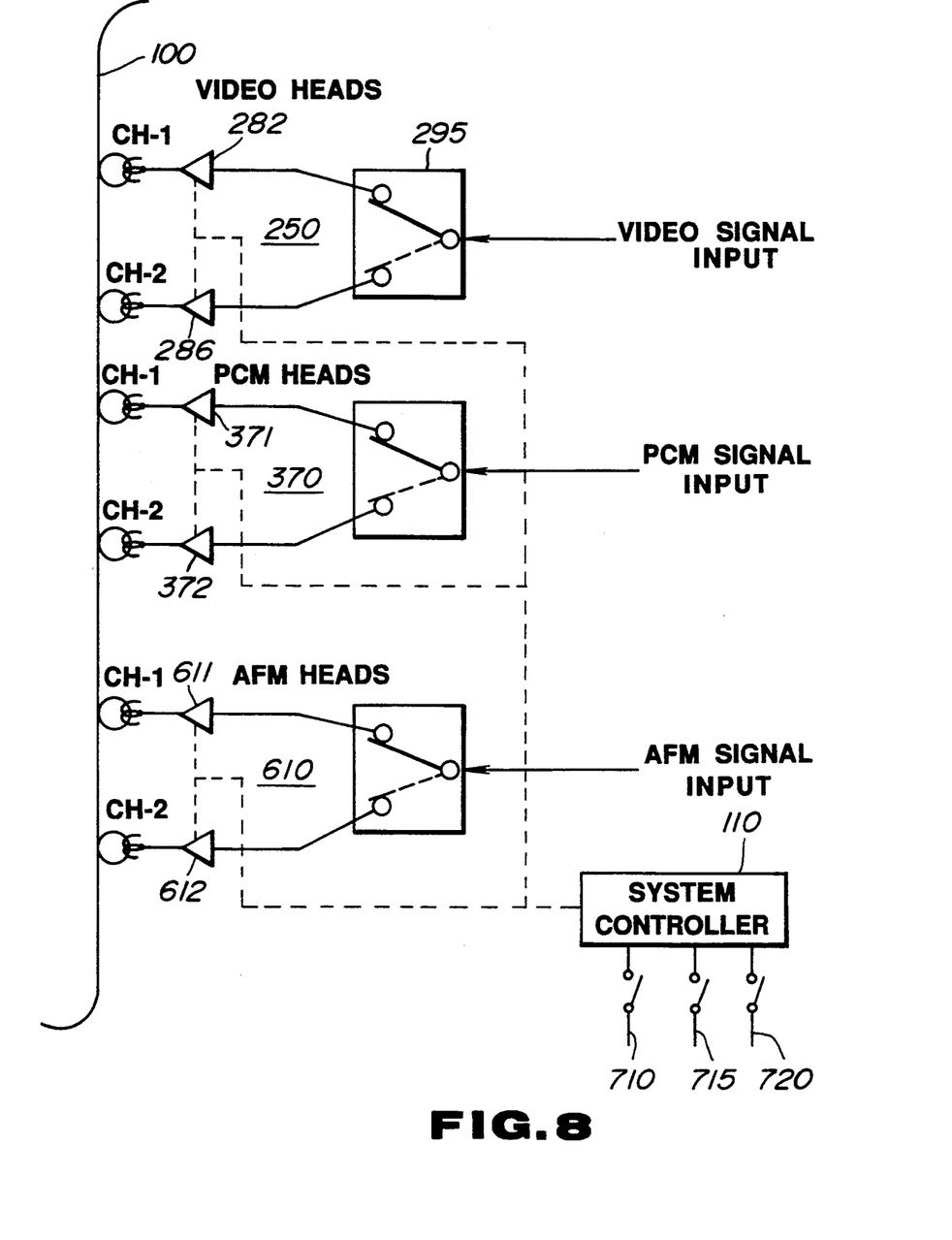
FIG. 8 is a schematic block diagram which shows a signal recording system according to the invention for selectively recording a video signal with a PCM audio signal, and/or an FM audio signal.

The signal recording system of FIG. 8 for selectively recording a combination of video signals, PCM audio signals and FM audio signals, or any one thereof is shown to include a video head unit 250, a PCM head unit 370 and an AFM head unit 610 which generally correspond to the video head unit shown in FIG. 1, the PCM head unit in FIG. 2, and the AFM head unit in FIG. 7.

Recording amplifiers 282 and 286, 371 and 372, and 611 and 612 are respectively connected to the system controller 110. Mode selection switches 710, 715 and 720 are shown connected to the system controller 110 which, in response to selective actuation of the switches 710, 715 and 720, transmits signals for controlling recording of video and/or PCM and/or AFM signals, respectively. The mode selection switches 710, 715 and 720 associated with the system controller 110 can be closed, for example, as indicated by the symbols [0] in the columns headed "Video Signal" "PCM Signal" and "FM Signal" respectively, in Table I, so as to establish the recording modes A-G.

The system controller 110 provides suitable control signals to the recording amplifiers 282 and 286, 371 and 372, and 611 and 612 so that their signal lines to their associated rotary magnetic heads are turned on or off, in response to such control signals. Thus, according to the switching operations of the switches 710, 715, and 720, recording operations corresponding to the recording modes A-G shown in Table I can be effected.

Figure 9:
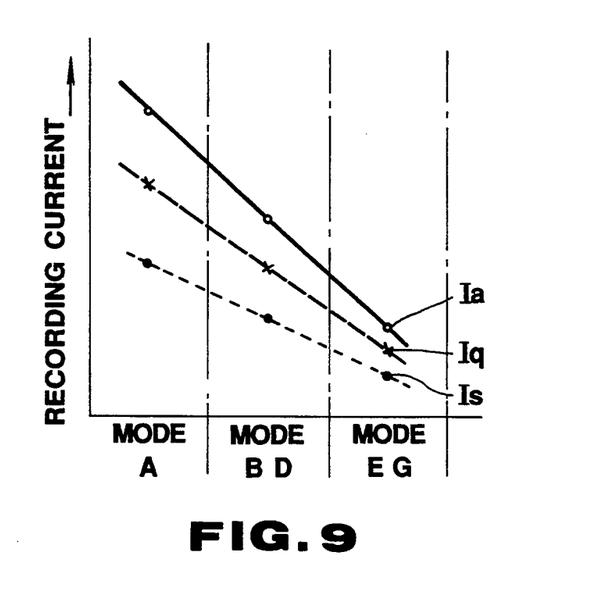
FIG. 9 is a graph which shows the relationship of recording currents used for recording a video signal, a PCM audio signal and an FM audio signal on a magnetic tape by means of the system of FIG. 8.

The magnitudes of the recording currents for the video signal, the PCM signal, and the AFM signal are changed according to the selected one of the recording modes A to G. The recording currents Is, Iq, and Ia (FIG. 9) flowing through the rotary magnetic heads for recording the video signal, the PCM signal, and the AFM signal, respectively, are defined by the following relation, as shown in FIG. 9, regardless of the selected one of the recording modes A to G.

$$Ia > Iq > Is$$

The recording currents Ia, Iq, and Is employed in the recording modes B to D, are greater than those employed in the recording modes E to G, while the recording currents Ia, Iq, and Is employed in recording mode A are greater than those employed in the recording modes B to D.

The magnitudes of the recording currents Is, Iq, and Ia in the normal recording mode are greater than those in the long-recording mode, in which the tape speed is reduced. The current magnitude relationships between the recording currents Is, Iq, and Ia are maintained not only during recording in the normal recording mode, but also during recording in the long-recording mode or low speed recording mode. The system controller 110 provides control signals to the recording amplifiers 282 and 286, 371 and 372, and 611 and 612 to control the magnitudes of the recording currents Is, Iq, and Ia, respectively.

Figure 10:
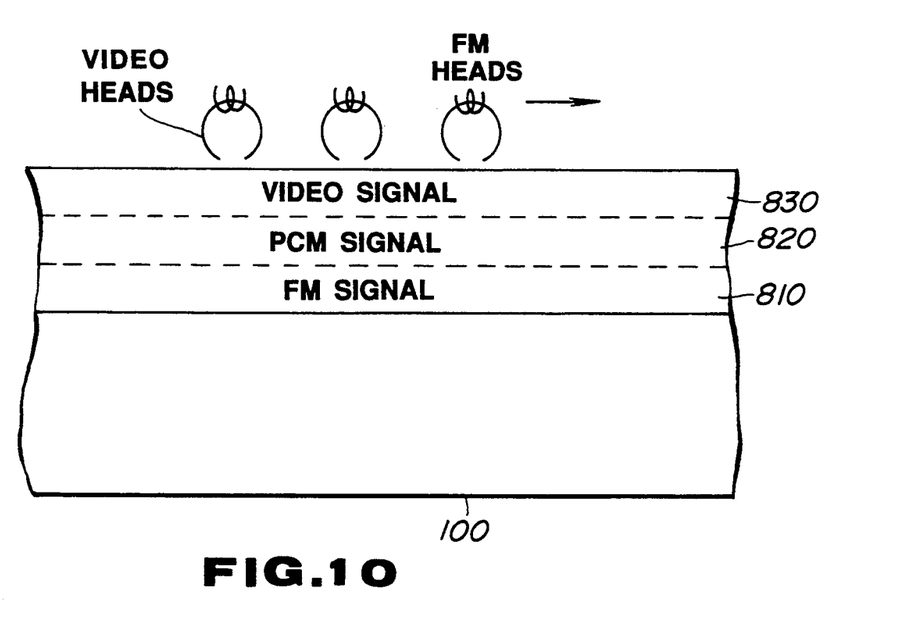
FIG. 10 is a schematic cross sectional view which shows a magnetic tape on which a video signal, a PCM audio signal, and an FM audio signal have been recorded by the system shown in FIG. 8.

Therefore, during recording in recording mode A, an AFM signal is recorded by the AFM heads in respective diagonal tracks each corresponding to one field. Additionally, a PCM signal is recorded by the PCM heads so as to be superimposed on the recorded AFM signal. Further, a video signal is recorded by the video heads so as to be superimposed on the recorded AFM and PCM signals. In order to effect the recording process described above, the recording currents of the signals are set in the relation shown in FIG. 9. It will be noted that as a result of such relation of the recording currents, and as shown in FIG. 10, the AFM signal is recorded at the deepest layer 810 of the magnetic layer of the tape 100, the PCM signal is recorded in a middle layer 820, and the video signal is recorded in a surface or shallow layer 830.

The FM audio signal and PCM audio signal reproducing system described above with reference to FIG. 5 reproduces either the FM audio signal or the PCM audio signal. Therefore, utilizing a VTR according to the present invention, as shown in FIG. 8, alloys apes to be recorded with both and PCM audio signals representing the same program material. This feature allows magnetic tapes recorded by the VTR embodying the invention to be played back in VTRs which reproduce only FM audio signals, or alternatively, in VTRs which reproduce only PCM audio signals.

In recording mode B of Table I, the PCM signal is recorded at a layer deeper than the video signal which is recorded nearest the surface. In recording mode C, the AFM signal is recorded at the deeper layer, while the video signal is recorded as in mode B. In recording mode D, the AFM signal is recorded at the deeper layer, while the PCM signal is recorded nearest the surface.

Moreover, in recording modes E to G, a single signal, being the AFM signal, the PCM signal, or the video signal is recorded in the layer of magnetic tape corresponding to the recording current specified for that type of signal.

Since no video signal is recorded during recording in modes D, F, and G, servo control is carried out during such recording of one or both of the FM and PCM audio signals on the basis of a synchronizing signal suitably provided by the video tape recorder.

Since the magnitudes of the recording currents Is, Iq and Ia of the video signal, the PCM signal, and the FM signal are controlled to provide the relations shown in FIG. 9, the signal to noise ratio for each signal is greatly improved. Thus, for example, the error rate of the PCM audio signal can be reduced. Further, when recording, signals appearing at the several signal input lines shown on FIG. 8 may be detected to provide additional indications of the presence of the input signals to the system controller 110. The system controller 110 may also automatically control or establish the various recording modes A to G, for example, on the basis of such indications of the presence of the several input signals or otherwise, rather than in response merely to the actuation of the mode selection switches 710, 715 and 720.

Although specific embodiments of the invention have been described in detail herein with reference to the accompanying drawings, it will be understood that the invention is not limited to those specifically disclosed embodiments, and that various changes and modifications may be effected therein by one skilled in the art without departing from the scope or spirit of the invention as defined in the appended claims.

What is claimed is:

1. A video tape recorder comprising:
   signal source means for providing an FM audio signal, a PCM audio signal and a video signal;
   first, second and third recording means including respective rotary magnetic heads and being selectively operative for recording, in a magnetic coating on a magnetic tape, said FM audio signal, said PCM audio signal and said video signal with first, second and third recording current, respectively;
   recording mode selecting means for selectively establishing at least a first mode in which said FM audio signal, said PCM audio signals and said video signal are recorded, a second mode in which only said PCM audio signal and said video signal are recorded, a third mode in which only said FM audio signal and said video signal are recorded, and a fourth mode in which only said PCM audio signal and said FM audio signal are recorded; and
   recording current controlling means for controlling said first, second and third recording currents so that, in said first mode, a value of said first recording current is larger than a value of said second recording current which is larger than a value of said third recording current; in said second mode, said second and third recording currents have values smaller than their respective recording current values in said first mode and the value of said second recording current is larger than the value of said third recording current; in said third mode, said first and third recording currents have values smaller than their respective recording current values in said first mode and the value of said first recording current is larger than the value of said third recording current; and, in said fourth mode, said first and second recording currents have values smaller than their respective recording current values in said first mode and the value of said first recording current is larger than the value of said second recording current.

2. A video tape recorder according to claim 1; in which said recording mode selecting means is further operative to selectively establish fifth, sixth and seventh modes in which only said video signal, only said PCM audio signal, and only said FM audio signal, respectively, are recorded; and in which said recording current controlling means is further operative in said fifth, sixth and seventh modes to make said third, second and first recording currents smaller than the third recording current in said second and third modes, the second recording current in said second and fourth modes, and the first recording current in said third and fourth modes, respectively.

3. A video tape recorder according to claim 2; further comprising:
   reproducing means for reproducing said FM audio, PCM audio and video signals from the magnetic tape;
   first detecting means for detecting said FM audio signal in the reproduced signals and being operative to provide a first detecting signal indicative of the presence of said FM audio signal;
   second detecting means for detecting said PCM audio signal in said reproduced signals and being operative to provide a second detecting signal indicative of the presence of said PCM audio signal;
   signal output means;
   switching means for selectively supplying said FM audio signal and PCM audio signal from said reproducing means to said signal output means; and
   reproducing control means for controlling said switching means in response to said first and second detecting signals to selectively output said FM audio and video signals and said PCM audio and video signals through said signal output means.

4. A video tape recorder according to claim 3; further comprising reproducing mode selecting means for selecting a first reproducing mode in which said FM audio signal is reproduced and a second reproducing mode in which said PCM audio signal is reproduced; and in which said reproducing control means causes said switching means to output the one of said FM audio and PCM audio signals selected by said reproducing mode selecting means for output with said video signal through said signal output means when the recorded signals include said FM audio and PCM audio signals as well as said video signal.

5. A video tape recorder according to claim 1; in which said second recording means includes a phase modulation circuit for said PCM audio signal comprising separating means for separating a PCM audio signal into a first data stream and a second data stream, a first balanced modulator for receiving said first data stream, a second balanced modulator for receiving said second data stream, carrier supply means for supplying first and second carriers to said first and second balanced modulators, respectively, with the phases of said first and second carriers being relatively shifted by a predetermined amount, an adder for adding an output signal from said first balanced modulator and an output signal from said second balanced modulator, and a band-pass filter receiving an output sum signal from said adder.

* * * * *